United States Patent

[11] 3,569,700

[72] Inventor Joseph G. Quinn
     Milwaukee, Wis.
[21] Appl. No. 851,881
[22] Filed Aug. 21, 1969
[45] Patented Mar. 9, 1971
[73] Assignee General Electric Company

[54] RAPID RADIOGRAPHIC ROLL FILM CHANGER HAVING A PRESSURE PLATEN ACTUATED BY AIR PRESSURE
7 Claims, 9 Drawing Figs.

[52] U.S. Cl. .................................................... 250/66, 250/68
[51] Int. Cl. ........................................................ G03b 41/16
[50] Field of Search .......................................... 250/65, 66, 68

[56] References Cited
FOREIGN PATENTS
25,328  11/1911  Great Britain ................  250/68
1,285,860  12/1968  Germany .....................  250/66

*Primary Examiner*—James W. Lawrence
*Assistant Examiner*—A. L. Birch
*Attorneys*—Ralph G. Hohenfeldt, Frank L. Neuhauser, Oscar B. Waddell and Joseph B. Forman ABSTRACT: X-ray film is cyclically compressed, exposed, decompressed and advanced in a path between a platen and a film compression chamber and two intervening intensifying screens. A diaphragm on the chamber distends when subjected to air pressure and produces the contact pressure. A two-port rotary valve pressurizes the chamber, allows time for an exposure and exhausts the chamber for releasing the film. Another synchronously driven rotary valve has a port for projecting a pulse of air against the released film to form a loop in it and advance it from a preformed loop on the input side. A motor driven toothed-wheel forms the input loop from film in a feed magazine and advances the film output loop into a takeup magazine.

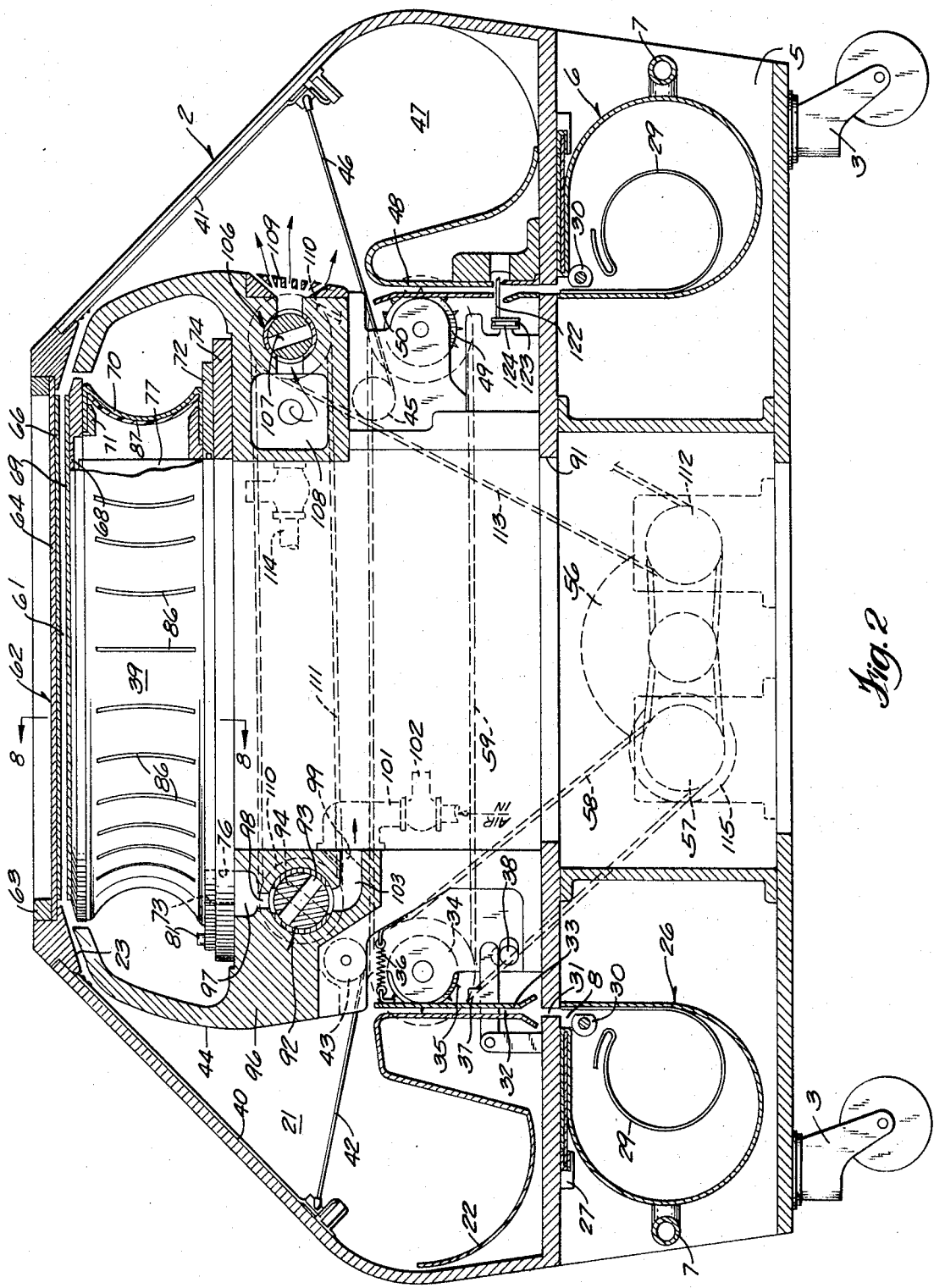

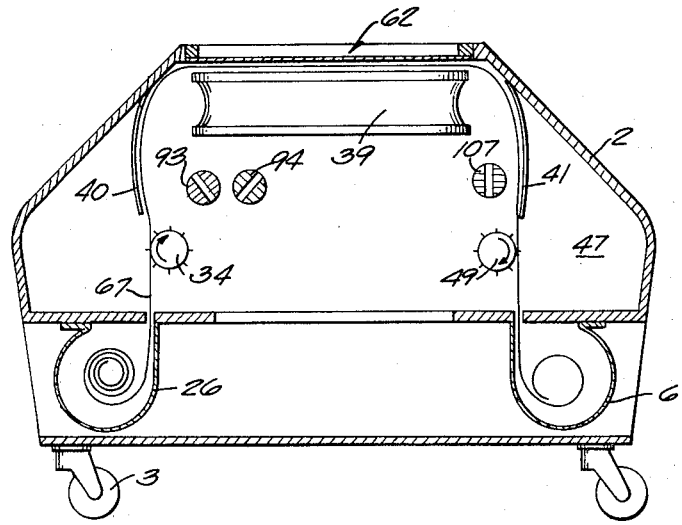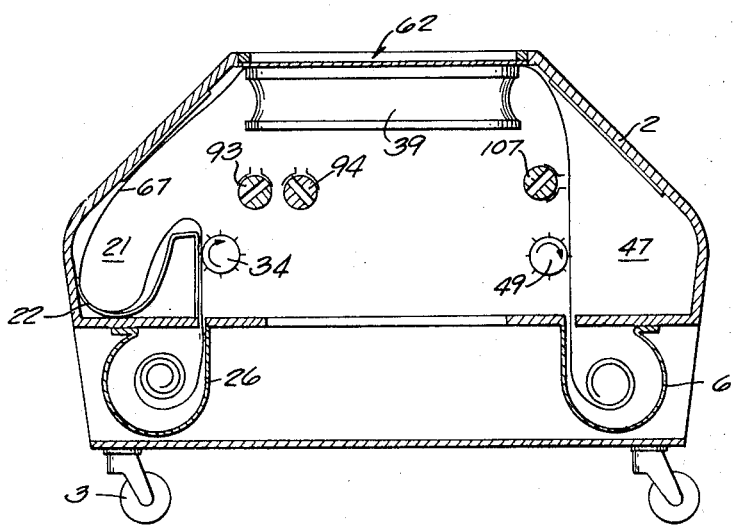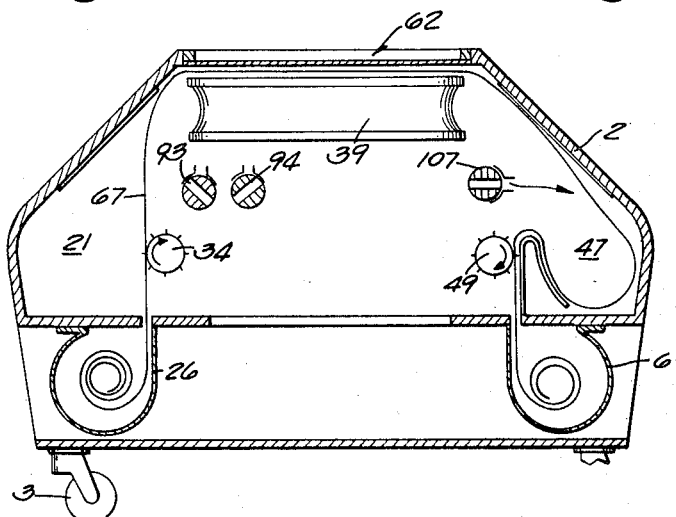

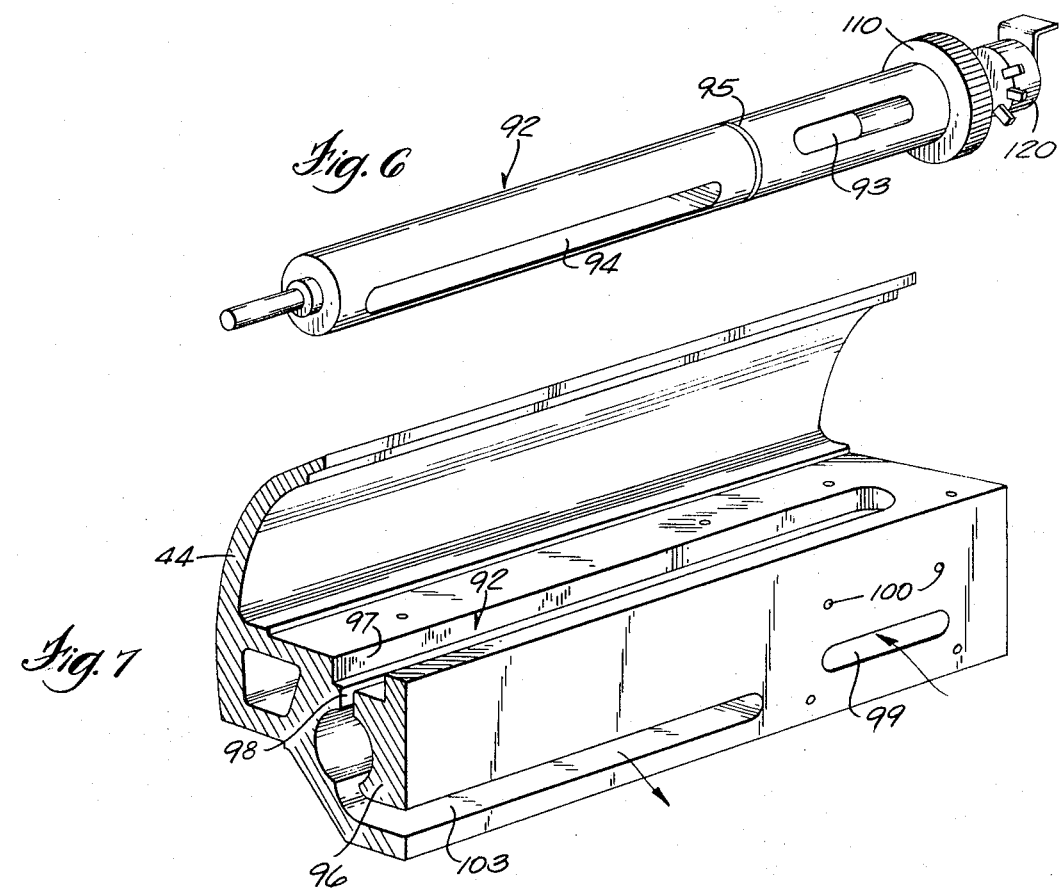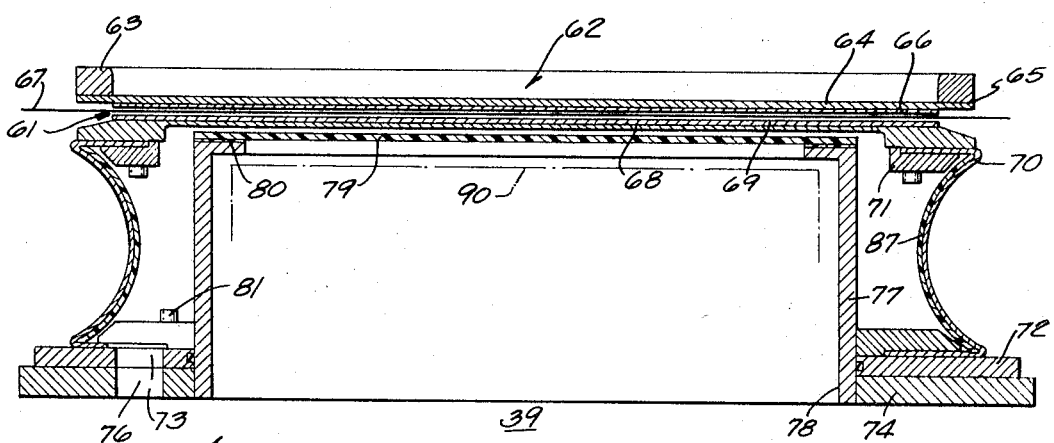

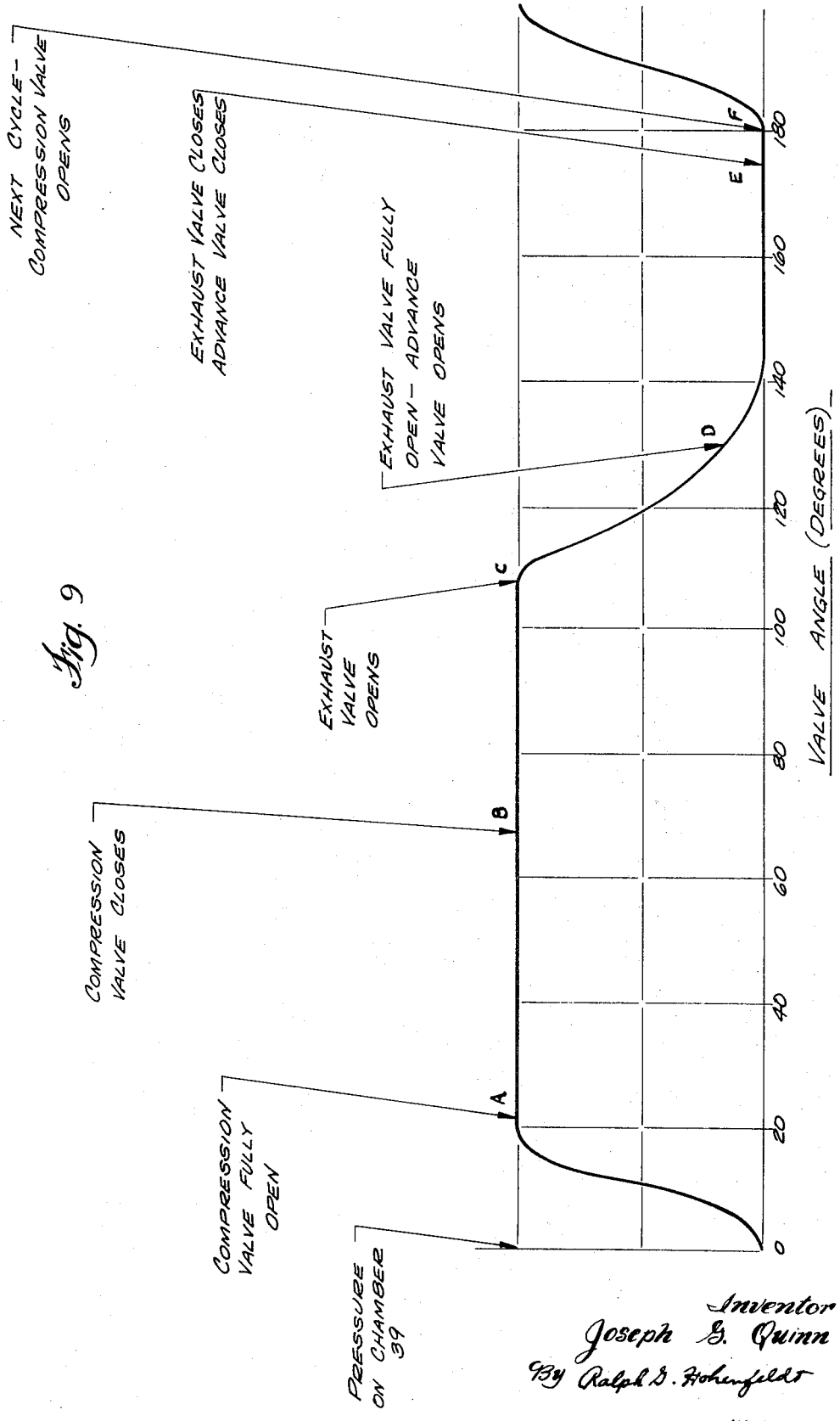

3,569,700

RAPID RADIOGRAPHIC ROLL FILM CHANGER HAVING A PRESSURE PLATEN ACTUATED BY AIR PRESSURE

BACKGROUND OF THE INVENTION

One method of assessing the human cardiovascular system is to inject a radiopaque dye and record its progress through the blood vessels or heart by taking one or more rapid series of radiographs. In some cases, the radiologist desires to expose as many as 12 film frames per second which means that the film must be advanced, compressed between two intensifying screens, exposed, released and advanced at a similar rate. Since the film is usually about 14 inches wide, it should be evident that a considerable mass has to be accelerated rapidly and stopped abruptly. Operation has been extremely noisy with the mechanical film advancement mechanisms which have been used. The noise is sufficient to justify forewarning the patient and soundproofing the procedures room.

Prior film changers have other disadvantages besides being noisy. Sometimes they produce a nonuniform contact pressure between the intensifying screens and intervening film. This produces film blurring, especially near the edges. Events in the film advance cycle sometimes occur at displaced intervals so that synchronization with a similar film changer, used in a biplane technique, is imperfect. This may result from free-play which is inherent in mechanical film advance mechanisms. Also, there is usually vibration which causes slight film blurring and loss of resolution. Occasionally, there are variances in the time interval between initiation of the first film frame in a sequence and injection of the radiopaque dye in the vascular system.

SUMMARY OF THE INVENTION

An object of the present invention is to provide a roll film changer that is capable of high frame rates and has consistent synchronization of the film compression, exposure, and advancement steps regardless of frame rate.

Another object is to provide a film changer that is complete insofar as functional features are concerned but is, nevertheless, simple in construction and reliable.

A further object is to minimize the operational noise level of the film changer.

Additional objects are to provide a rapid film changer which is subject to diversified and precise programming, which is easy to unload with film and otherwise requires little care, skill or attention on the part of the operator.

In general terms, the invention is characterized by a film changer housing which is on casters for being positioned under an x-ray examination table. The changer has a film feed magazine and a film takeup magazine. The film is automatically threaded over a film pathway which has air operated film compression device in the exposure region. A rotary valve for pressurizing and exhausting the compression chamber is mechanically coupled with another rotary valve that projects a precise pulse of air against the film to advance it after exposure and decompression are complete.

A single motor drives the rotary valves and some mechanically coupled toothed film advancing wheels so that all moving parts maintain their phase relationship regardless of filming rate.

Rotation of the toothed-wheels is initiated with the exposure sequence and a free loop of film is thereby formed on the input side of the compression chamber. The loop on the output side is also continuously taken up and fed into the takeup magazine by the toothed-wheels.

The pressurized air or other gas input to the rotary valves is controlled by electrically operated solenoid valves. Although the rotary valves are turning before an exposure sequence is initiated, they are inactive until the solenoid valves are opened. Once the solenoid valves are opened, they remain open for the entire filming series of as many as 12 frames per second.

Means are also provided for automatically threading the film from the film feed magazine and film takeup magazine.

A more detailed detailed description of a preferred embodiment of the new roll film changer will now be set forth in reference to the drawings.

DESCRIPTION OF THE DRAWINGS

FIG. 2 is a partial vertical cross section through one of the film changers;

FIGS. 3, 4, and 5 show the film and its advance mechanism schematically in various states during a threading and an exposure cycle;

FIG. 6 is an isolated perspective view of the rotatable valve shaft for the valve which controls compression and exhausting of the film compression chamber;

FIG. 7 is a fragmentary perspective view of the stationary casting of the pressurizing and exhaust valve with the rotatable element of FIG. 6 omitted;

FIG. 8 is a vertical section of the film compression chamber taken on the line 8—8 in FIG. 2; and, FIG. 9 is a graph for demonstrating the operational sequence of the rotating valves.

DESCRIPTION OF A PREFERRED EMBODIMENT

Figure 1:
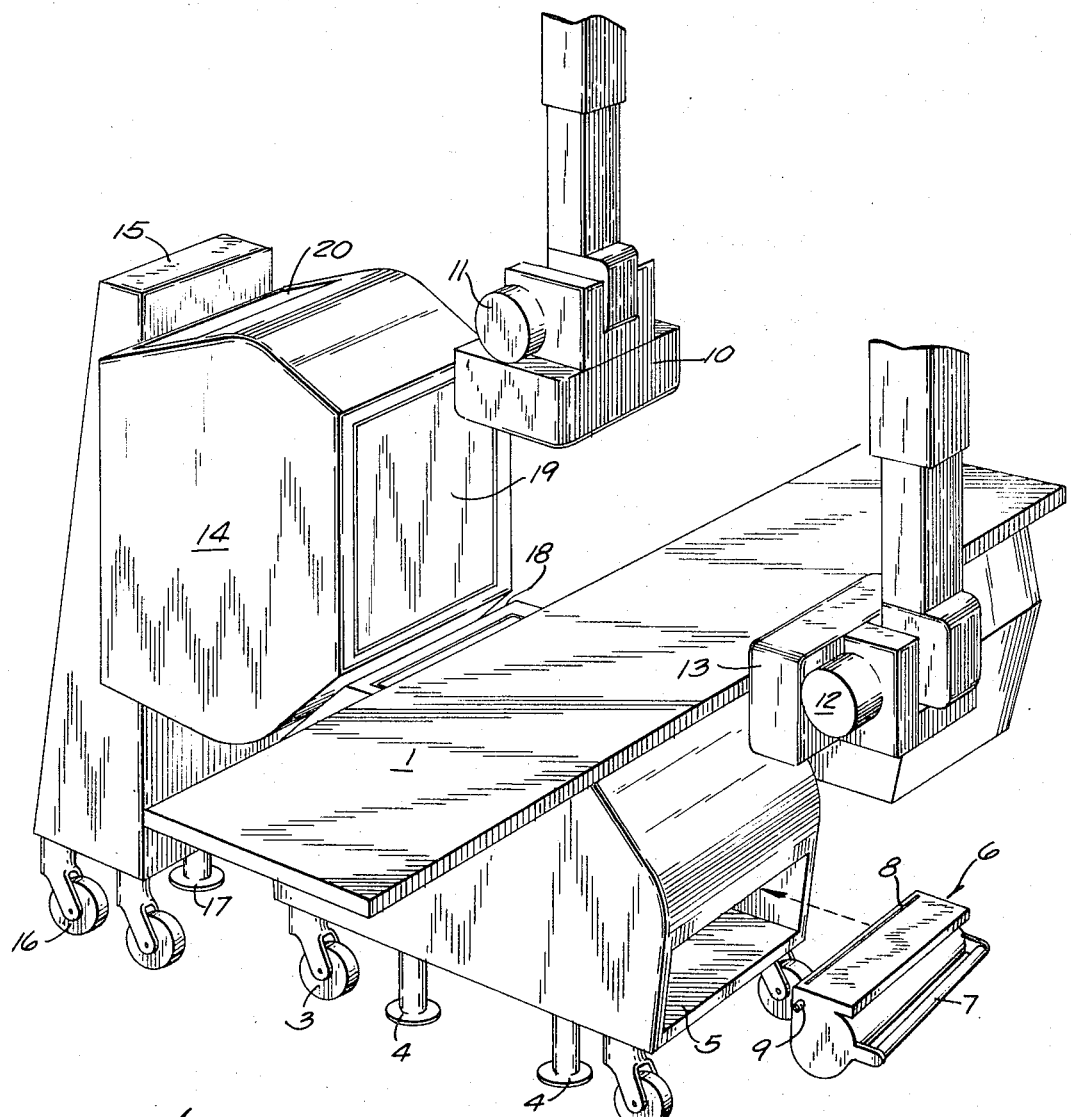
FIG. 1 is a perspective view of a typical x-ray cardiovascular procedure arrangement showing two of the new film changers positioned for biplane examination.

In FIG. 1, the patient, not shown, is ordinarily supported on an x-ray transmissive table top 1. The support for the table top has been omitted. One of the new film changers is under the table top for frontal examination. The changer comprises a housing 2 and is supported on casters 3. When the changer is in position, some pads 4 are brought down manually so that the changer is supported on the pads instead of the casters when in use.

In FIG. 1, frontal radiographs are taken when x-radiation projects through a collimator 10 from an x-ray tube casing 11. Operation of the x-ray tube is synchronized with the film changer so that exposure will occur only when the film is stationary and compressed between some intensifying screens in the changer.

Housing 2 has an opening 5 in its end for receiving a film takeup magazine 6. This magazine is structurally the same as a film feed magazine 26 which inserts into the other end of housing 2, as can be seen in FIG. 2. The film magazine has a slot 8 in its top through which film may be fed in or out depending on whether the magazine is used to feed or takeup film. Under slot 8 inside the magazine is a light seal, not shown, which permits carrying magazines between the changer and the darkroom without permitting extraneous light to strike the film. Each magazine has a handle 7 for carrying it and for inserting and withdrawing it with respect to housing 2.

Another x-ray tube casing 12 and a collimator 13 may be provided for taking a rapid series of radiographs laterally of the body so the changers may be operated in a biplane mode. Lateral radiographs are recorded in a second film changer 14 which is carried by a stand 15. The stand also has wheels 16 and a set of foot pads 17 for placing it firmly on the floor of the procedures room. Note that the changers are beveled at their corners 18 so that their film planes will be nearly intersecting and all parts of the patient's anatomy above the plane of table top 1 will be projected onto the film. The film in each changer is immediately behind and in parallel with a face plate 19 which is preferably a decorative x-ray transmissive laminated plastic material. The vertically positioned film changer 14 also has an opening 20 for installing and removing a film takeup magazine and another opening, not shown, as its bottom for inserting a loaded film feed magazine.

Refer now to FIG. 2 which shows a vertical section taken through horizontal film changer housing 2. Within the film changer housing is a film feed magazine 26 which is shown without film in it. The magazine is removably attached within the housing at 27 by any suitable means that permit a good light seal between a planar surface 28 and the exit slot 8 for the film. The magazine may be loaded in a darkroom with a coil of film that is disposed inside a curved spring 29 which is expanded when it is loaded and contracts to maintain the film fairly tightly coiled as it is fed out through slot 8. Each magazine contains a flat sided rubber roller 30 which is turned diametrically oppositely from the position in which it appears in this FIG. to effect a light seal against the film and maintain the leader which projects from the magazine. The leader is long enough to project from the magazine. The leader is long enough to project through a slot 31 and into the interspace 32 of a guide member 33. A wheel 34 having several equiangularly spaced needle points 35 projects through a suitable slot in film guide 33 to engage the film at its edge and advance the same when the wheel 34 is rotated under power.

Film guide 33 is biased into the position in which it is shown by a spring 36. The film guide may be urged to the left to preclude points 35 from engaging the film leader when it is being started through the guide before the automatic threading procedure is initiated. The film guide may be urged to the left manually under the influence of a cam 37 which is on a lever that can be rocked by an eccentric 38 which is accessible and operable from outside of the film changer. When the leader of the film is in position for being engaged by needle points 35, film guide 33 is allowed to rock back under the influence of spring 36. Then the needle wheel 34 and another one 49 like it are power-driven so that the film 67 is threaded from feed magazine 26 to takeup magazine 6 as depicted in FIG. 3.

During normal operation, a loop is formed in the film immediately after it leaves film guide 33. An input loop cavity 21 is provided for this purpose. It has a loop-forming guide 22 near its bottom which shapes the film as can be seen best in FIG. 4. After the loop is formed in the film, it projects into a guide slot 23 near the top of the input loop cavity 21 where it is admitted to the interspace between a platen 62 and a film compression device which will be described in more detail later, and is generally designated by the reference numeral 39 in FIG. 2.

During automatic threading, the film must be transported in its most direct path from feed magazine 26 to the film takeup magazine 6. To assure that the film will thread automatically through the changer without forming loops at first, suitable deflectors 40 on the feed side of compression chamber 39, and 41 on the output side of chamber 39, are provided. Since both deflectors 40, 41 are similar in construction and operation, only the former will be described. Deflector 40 is a thin sheet of phosphor bronze or other spring material which has a cord 42 attached to it. The cord is wound around a pulley 43 behind which, but not visible in FIG. 2, is a small cylindrical motor which is energized only during the first stage of automatic film threading. When the motor is energized, cord 42 is wound on pulley 43 and the deflector 40 is brought over to nearly contact a curved surface 44 to offer further guidance to the film as it is proceeding toward and into slot 23 on the input side of the compression chamber 39. This may be visualized best in FIG. 3. A similar motor and pulley 45 winds up a cord 46 to bring over deflector 41 in the output loop chamber 47. On the output side, there is another film guide 48 to direct the film into takeup magazine 6 and a film advancing wheel 49 with needle points 50 for propelling the film.

Automatic film threading is initiated by pressing a button on a programmer, not shown, after the film leader has been started into input film guide 33. This causes the deflectors 40, 41 to take their guide positions automatically and starts a main drive motor 56 which drives toothed-wheels 34 and 49 through the agency of a clutched pulley 57 and a pair of belts 58 and 59. Present, but not shown, in the region of output film guide 48, is a sensor that detects the presence of the incoming film and turns off motor 56 after a predetermined time lapse which permits film to enter takeup magazine 6 and begin winding a coil of about one turn within it. At this time, deflectors 40, 41 return automatically to the position in which they are shown in FIG. 2 and the film is clamped momentarily by compression chamber 39 so as to permit the last revolutions of motor 56 to form a loop in input cavity 21. The condition of the film that prevails at this time may be seen in FIG. 4. The changer is now substantially ready for a rapid film series.

In FIG. 2, that portion of the film which is ready for an x-ray exposure is in the interspace 61 between the film compression chamber 39 and the pressure platen which is generally designated by the reference numeral 62. A cross section of the pressure chamber 39 and platen 62 is shown in FIG. 8, which will now be discussed. The platen 62 comprises an aluminum frame 63 on which a plate 64 of beryllium or aluminum or other x-ray transmissive material is brazed at 65. Adhered to the face of plate 64 is a thin x-ray image intensifying screen 66. The screen, of course, produces a fluorescent replica of the x-ray image and aids in exposing the film. The film 67 passes through the interspace 61 and is subject to being pressed from the center of the exposure area toward its edges by a distensible metal diaphragm 68 which is part of the film compression chamber 39. Diaphragm 68 is preferably milled to a thin cross section from a thicker piece of sheet stock so that the end product will be thin over most of its area and perfectly planar. Adhered to the face of diaphragm 68 is another intensifying screen 69 which serves the same purpose as its counterpart on the platen.

Diaphragm 68 is fastened to an annulus 70 by means of suitable clamping members 71. Annulus 70 is also clamped and sealed to a lower ring 72 in which there is a long slot or port 73 for admitting air or other gas under pressure beneath the diaphragm 68 to distend or bulge it. Ring 72 rests on another flat base member 74. Member 74 has a port 76 which aligns with port 73 so that pressurized air may be admitted and exhausted from the pressure chamber. Any pressurized fluid could be used, including bottled gas, but use of air is preferable for convenience and economy. Member 74 has s circular central opening to which is welded an axially extending hollow cylinder 77 in which there is a central bore 78. The bore is covered on top with a planar piece of laminated plastic 79 and there is a suitable gasket 80 around cylinder 77 for preventing leakage. The assembly may be secured in a leakproof manner on the film changer casting by tightening of circularly spaced machine screws 81. Silicone adhesive is used as a sealant in most joints that are intended to be leakproof.

Annulus 70 is provided with a plurality of axially extending and circumferentially spaced expansion slits 86. There is a coating 87 of rubber sealant on the inside of annulus 70 which prohibits air from leaking through slits 86. The annulus 70 may be made of fiber glass or other material that is capable of flexing. When the interior of the chamber is pressurized to distend diaphragm 68, contact is first made with the film at the center of the diaphragm and the contact area spreads out toward the edges in an instant. However, because the diaphragm 68 is metal, there is a practical limit to the amount which it may be distended and it is, therefore, necessary to let the annulus 70 expand axially which it can do by letting its curved cross section expand radially. The slits 86 that are disposed around the annulus permit this to happen with least resistance. Internal air pressure also tends to expand the inwardly concave annulus outwardly. This extends its axial dimension and develops a uniform high contact pressure from the center to the edges of intensifying screens 66 and 69 during film exposure.

The x-ray permeability of the platen 62 and the top of pressure chamber 39 is such that use of an image intensifier, not shown, is permitted. The outside diameter of the intensifier may nearly equal the bore 78 in FIG. 8. As can be seen, the construction of the pressure chamber is such that intensifier may be brought up to the bottom of plastic plate 79 which is close to the plane of the film. The intensifier is omitted from FIG. 2, but it would extend through a hole 91 in partition plate 28 and up into the interior of the film compression chamber 39 as indicated in FIG. 8. It should be noted that the pressure chamber is especially designed to have a small air volume which comprises the volume between the outside of cylinder 77 and the inside of annulus 70 and the small volume between plastic plate 79 and diaphragm 68. This not only conserves the use of pressurized gas or air but permits more rapid expansion of the diaphragm and exhaustion of the pressure chamber. In a commercial embodiment, even at a frame rate of 12 per second, about 50 percent of each complete film advance cycle is available for x-ray exposure owing to rapid film transport and rapid operation of the film compression chamber at a gauge pressure of about 6 pounds per square inch.

Pressurizing and exhausting the film compression chamber 39 is controlled by a rotary valve shaft 92 which is shown isolated in FIG. 6 and which is adapted to be installed in the casting 96 shown in FIGS. 2 and 7. The valve shaft 92 is provided with a pair of angularly and axially separated slots or ports 93 and 94. Slot 93 is for admitting air or other pressurized gas to the film compression chamber and slot 94 is for exhausting it. The slots are isolated from each other by an O-ring seal 95 which resides in a suitable groove in the valve shaft. In FIGS. 2 and 7 one may see that a casting 96 is provided with a groove or header 97 which serves as a common passageway between the valve shaft and the interior of chamber 39 for both exhausting and pressurizing. Header 97 has a slot 98 in its bottom which aligns with either the air inlet slot 93 or exhaust slot 94 of rotary valve shaft 92 depending on the angle of shaft rotation.

In FIG. 7 one may see that pressurized air is admitted to the bottom periphery of valve shaft 92 through a duct 99 which is surrounded by some threaded holes 100 for connecting a flanged elbow 101 that can be seen best in FIG. 2. Pressurized air is turned on at the start of the film series and turned off at the end of a series by a solenoid valve 102 which is shown only in FIG. 2. Thus, when solenoid valve 102 is opened, pressurized air will flow through duct 99, rotating port 93, stationary valve slot 98, header 97, and slot 76 to the interior of compression chamber 39. The width of these slots 98, as well as the widths and locations of slots 93 and 94 are very carefully controlled. It is this dimensional control which allows the prescribed timing. During the procedure, air pressure is continuously extant in slot 99. The alignment of slot 93 with slot 99 determines the times of admittance and cutoff of air to the compression chamber. As valve rotation continues, the exhaust port 94 in rotatable valve shaft 92 aligns with slot 98, and permits exhaustion of the film compression chamber 39. The air is exhausted to the interior of the film changer housing from a duct 103 which can be seen best in FIG. 7.

A basically similar rotating film advancement valve shaft 106 is also provided as illustrated in FIG. 2. This valve has a single port 107 to pass pressurized air from a header chamber 108 to a multisotted nozzle 109 when the valve is in the proper angular position. Port 107 in film advance valve 106 is so phased with slots 93, 94 in rotary compression valve shaft 92 that a pulse of air can only be delivered for forming an output film loop in cavity 47 when compression chamber 39 is substantially exhausted and the film is free to move. Note that the device could be made with only one rotary valve shaft in which case the compression and exhaust ports 93 and 94 could be axially and angularly displaced on the shaft and the film advance port 107 could be further axially displaced at a proper angle. This, too, assures synchronous operation of the valves.

Both rotating valve shafts 92 and 106 have a pulley such as the one marked 110 in FIG. 6. The pulleys are toothed to permit coupling both rotary valves 92 and 106 for simultaneous and synchronous rotation with a timing chain or belt such as 111 in FIG. 2. This type of belt assures that the phase relationship between the rotatable valve shafts will be maintained. The film advance rotary valve shaft 106 has another pulley which is driven with a belt 113 from a motor-driven pulley 112. Hence, in this particular construction, valves 92 and 106 rotate whenever driving motor 56 is energized. Pressurized air for advancing the film is supplied to header 108 through another solenoid valve 114. Unless valve 114 is open, no air pressure will be available to advance the film to form a loop in it even through film advance valve 106 is rotating. Solenoid valve 114 is opened at the start of a rapid film series and remains open until the end of the series. Air pressure for advancing the film is about 15 pounds per square inch in a commercial embodiment.

The toothed-film advance wheels 34 and 49 do not, however, rotate when motor 56 is energized unless an electrically operated magnetic particle clutch 115 is engaged. In a commercial embodiment, there are actually two separately controlled clutches which operate simultaneously except during the film loop forming stages. The clutch may be engaged and toothed-wheels 34 and 49 rotated at the beginning of and throughout a rapid film series so that a loop is always being formed in input cavity 21. Film is continually being transported from the loop in output cavity 47 to the takeup chamber 6 when radiographing is in progress.

Synchronized operation of the film changer is governed to a large extent by a voltage derived from a rotary shaft angular position sensor which in this case is a potentiometer 120 which is shown for convenience in FIG. 6 as being mounted on valve shaft 92 that controls the film compression chamber. With a suitable electronic processor, not shown, the potentiometer output voltage signal is converted to one that varies linearly with respect to rotational angle of the valve. Therefore, the voltage amplitude an any instant corresponds with a definite angular position for each rotating valve.

The voltage signal can also be compared with a similar one from another changer for producing a control signal that enables taking precise alternate or simultaneous frontal and lateral x-ray exposures when the changers are used in a biplane procedure. Each changer has a tachometer, not shown, which is used in conjunction with the control signal from the potentiometer to maintain motor speed, synchronism between changers and the desired frame rate in the sequence. These control functions are carried on in a programmer which is not shown because it is not part of the present invention and can be devised by any skilled logic circuit designer.

The operating mode of the changer will now be considered in greater detail as an aid to understanding its construction. Assume that the radiologist has elected to take three rapid film series, each of which is called a phase. For instance, he may set the programmer to take 12 frames per second in the first phase and immediately follow with a second phase at some other rate such as 10 frames per second, after which the changer may pause for a set number of seconds and then proceed with a third phase automatically at another rate such as 4 frames per second. In a commercial embodiment, the operator may elect as many as 12 frames per second in any phase and as few as one frame every 10 seconds. The whole range of filming rates is available in steps in each phase.

Before a phase begins, the x-ray tube and dye injector, not shown, are made ready for operation. This means that the rotating anode of the x-ray tube is brought up to speed and its filament current is adjusted for producing x-rays of the intensity desired during the ensuing exposures. An exposure is initiated by applying high voltage between the anode and cathode of the x-ray tube. The dye injector may be set to inject immediately before the first film is taken or sometime thereafter. These are known elementary procedures which need not be described further.

Assume that when the changer is made ready, the film 67 will be disposed as in FIG. 4. At this time there is an input loop in cavity 21 and no output loop in cavity 47. Motor 56 may now be running and turning both of the rotating valves 92 and 106 which are not active unless pressurized air is applied to them. The film remains quiescent. Toothed-wheels 34 and 49 do not tend to advance the film until clutch 115 is energized.

Let us look at conditions that prevail right before the start of a phase or, in other words, before the first radiograph in a contemplated rapid series is taken. All events are reckoned from time 0 which is when the rotating compression valve port 93 is a few degrees prior to beginning opening or aligning with stationary port slot 98. At time 0, potentiometer 120 produces a 0 voltage output signal at which time electrical interlocks prevent taking an x-ray exposure because the film is not compressed. The rotary compression valve must rotate until it is closed after which the potentiometer output signal is proper to open compression solenoid 102. In the next half revolution of rotating valve 92, air will be supplied through its port 93 to the compression chamber and the film will be compressed. Pressure on the chamber is sensed with a pressure switch, not shown. The presence of pressure in the chamber then allows the film advance solenoid valve 114 to open but he film is not propelled by a pulse of air until the rotating film advance valve 106 attains the proper angular position at which time the compression chamber will be exhausted. The foregoing illustrates that a series cannot be started unless there is adequate time reckoned from time 0 to allow for the operating time of the compression solenoid 102 to thereby assure that full pressure will be applied to the compression chamber. Starting every series at a definite point in time also assures that all events will occur in their proper sequence.

In FIG. 9, the pressure on chamber 29 is plotted against the angular position of the pressure port 93 in rotating valve 92. At zero angle, the compression valve begins to open and it becomes fully open at point A. When the film is fully compressed at point A, the x-ray exposure is automatically initiated and it may be sustained for an exposure interval ending at point C or at 108°, at which angle the exhaust valve port 94 opens. One may see in FIG. 9 that pressure on the film persists long enough to permit an x-ray exposure to continue for almost half the time that it takes to cycle the changer. The proportion of exposure time to cycling time remains constant for all of the high frame rates because motor 56 runs at a constant speed that depends on the frame rate that is selected.

At point C in FIG. 9, inlet valve port 93 is fully closed and the exhaust valve port 94 is about to open and relieve the pressure in chamber 39. This is depicted physically in FIG. 4 which shows the film compression chamber 39 still compressed and the exhaust port 94 ready to open. In FIG. 4, one may see that the film advance valve port 107 is a few degrees in advance of opening when the exhaust valve port starts opening. An additional few degrees of rotation of both valves causes the exhaust valve to become fully opened as at point D on the graph in FIG. 9 at which time the advance valve fully opens. This causes an output film loop to be formed as shown in FIG. 5 under the influence of the pulse of air that is projected through port 107 and multislotted nozzle 109.

Since the toothed-wheels 34 and 49 are running continuously during each exposure sequence, a film input loop is constantly being formed and film is also being constantly withdrawn from the output loop fed into takeup magazine 6. Because the inlet and exhaust ports of the rotating compression chamber valve are angularly displaced from each other, there is a dead period from the time that the exhaust valve closes, at point E on the graph, to the beginning of the next cycle when the compression valve opens again at point F.

Since we have assumed in this example that the second phase would be at a slower frame rate than the first, motor 56 is automatically caused to slow down before the second phase begins. This speed change can be made in an instant because the DC motor 56 is supplied with full wave rectified DC through controlled rectifiers which are subject to firing angle variation. This is conventional DC motor speed control apparatus and is, therefore, not shown.

Changing the speed of motor 56 results in the speed of the toothed-wheels and rotating valves being changed so that the whole system remains in synchronism regardless of frame rate.

At the end of a phase, there may be a pause before the third phase begins. The solenoid valves 102 and 114 are, therefore, closed at the end of the second phase and clutch 115 is disengaged so the film will not be advanced by the toothed-wheels nor by film advance valve 106 which continues to rotate.

When all phases are complete, both solenoid valves 102 and 114 close and pressure chamber 39 is exhausted. Motor 56 continues to run and clutch 115 remains engaged to drive the toothed-wheels until the output loop which includes the last frame that was exposed is driven into takeup chamber 6.

Means are provided for cutting the films so that the frames taken of a given patient may be removed for development in an individual film takeup magazine. In FIG. 2, the cutoff means is seen to comprise a blade 122 that is attached to a cable 123 connected with a pair of motor-driven pulleys 124. When the pulleys rotate blade 122 translates across the film path and cuts the film.

At slow frame rates such as below 1½ frames per second, motor 56 is started and stopped for each frame exposure. The motor is energized and it cycles the changer to execute the film advance, compression, exposure and advance steps.

Sometimes the radiologist examines the patient with an x-ray image intensifier before beginning a film sequence. The image may be visualized on a television monitor, which is not shown, and is conventional. When the image intensifier is used, of course, the film frame which is in line with it and the compression chamber will be exposed. One may appreciate this by examining FIG. 8 which shows that the image intensifier would be behind the film. In the present design, whenever the intensifier is used, there is automatic film advancement to remove the single exposed film. This is achieved by energizing solenoid valve 114 and quickly forming a new output loop to thereby expel the exposed frame before the first frame in the filming series can be exposed.

In summary, a rapid film changer has been described. It has a film compression chamber which may be expanded with any fluid, gas or air. Compression and exhaust of the chamber is controlled by a rotary valve which is positively coupled with another rotary valve that advances the film at the proper instant after exposure. All steps in taking a film sequence are compelled to remain in the proper sequence. Timing signals are derived from a potentiometer which is positively coupled to both rotating valves to assure that phase relationships will be maintained. Operational sequence occur so rapidly that a large part of the time of each film cycle is available for making an x-ray exposure.

I claim:
1. A rapid radiographic film changer for use in a diagnostic system that interposes an examination subject between an x-ray source and a film, said changer comprising:
   a. film feed and film takeup means connected by a film pathway;
   b. a film pressure platen that is adjacent and substantially parallel with a portion of the film pathway and is adapted to transmit an x-ray image to the exposure region of a film in the pathway;
   c. a sealed film compression chamber having a diaphragm which is expandable to press the exposure portion of a film against the platen when the interior of the chamber is subjected to gas pressure;
   d. a stationary film compression valve member having inlet and outlet ports, the inlet port communicating with a source of pressurized gas and the outlet port communicating with the interior of the compression chamber;
   e. a first rotary valve member having a first through port for conducting pressurized gas from the inlet port to the outlet port and the chamber when the ports of the stationary and rotary members begin to align, said rotary valve member also having a through exhaust port angularly spaced from the first port for conducting gas from the outlet port and the chamber when the exhaust port begins to align with said outlet port;
   f. a stationary film advancing valve member having inlet and outlet ports, the inlet port communicating with a source of gas pressure and the outlet port being adapted to discharge gas against film which extends beyond said pressure chamber;
   g. a second rotary valve member having a through port for conducting pressurized gas from the last named inlet port to the outlet port and to the film surface whereby to periodically propel the film and form a loop in the film when the second rotary valve member has a predetermined angular relationship with respect to the first rotary valve member;

h. motor means; and i. means coupling said motor means and rotary valves for joint synchronous rotation, whereby to pressurize and exhaust said film compression chamber and sequentially project gas against the film to form said loop and advance the film.

2. The invention set forth in claim 1 including:

a. a potentiometer having a revolving shaft coupled for synchronous rotation with said rotary valve members, said potentiometer being adapted to produce an output electric signal whose magnitude is indicative of the angular position of the rotary valve members;

b. a first solenoid valve connected to the inlet of the compression valve and a second solenoid valve connected to the inlet of the film advance valve, said first and second solenoid valves being opened in that sequence in response to the potentiometer signal attaining predetermined consecutive magnitudes before the first film in a series of films is exposed, whereby all functions in an operational cycle of the film changer are started and maintained in a proper sequence and phase relationship.

3. A rapid radiographic film changer for use in a diagnostic system that interposes an examination subject between an x-ray source and a film, said changer comprising:

a. a film compression chamber and a spaced apart platen located next to the pathway followed by the continuous sheet of film as it is advanced step-by-step through the changer;

b. rotary valve shaft means having first, second and third diametrically through ports at different angles about the rotational axis, the first port being adapted to admit pressurized gas to the chamber when at a certain angle of rotation, the second port being adapted to exhaust gas from the chamber as the shaft means rotates further and, the third port being adapted to discharge pressurized gas against the film to form a loop in the film when the shaft means rotates still further, the said first, second and third ports operating in the stated sequence, respectively; and c. motor means mechanically coupled with the rotary shaft means to rotate the same, whereby the rotary valve means affect sequential expansion of the compression chamber, exhaust of the chamber and a gas blast against the film to advance the same.

4. The invention set forth in claim 3 including:

a. first and second electrically openable valves having pressurized gas inputs and having their outputs respectively connected to supply gas to the first port for compression the chamber and to the port for discharging gas against the film, the first electrically operable valve receiving a control signal to open it before the rotary valve means reaches an angular position where it can admit gas to the chamber and the second electrically operable valve being operated thereafter so that film will be advanced when the compression chamber has been pressurized and exhausted.

5. The invention set forth in claim 4 including:

a. a rotary shaft means angular position sensor adapted to produce an output signal corresponding in magnitude with the instantaneous angular position of the shaft means, operation of said electrically operable valves being in response to the signal level from said sensor.

6. The invention set forth in claim 3 wherein said film compression means comprises:

a. a semiflexible annulus having a radially inwardly curved cross section;

b. base means on which one end of the annulus is supported, said base means having a port for admitting pressurized gas to the interior of the annulus and for exhausting the same by means of the rotary valve means;

c. a thin metal diaphragm sealed over the other end of the annulus and adapted to distend into the film pathway toward said platen when the annulus is pressurized;

d. x-ray fluorescent screen means interposed between said platen and said diaphragm adjacent the film pathway, whereby distension of the diaphragm will compress the screen means and the film against the platen.

7. The invention set forth in claim 6 wherein said annulus has a plurality of circumferentially spaced axially extending slits whereby the curved cross section of the annulus may expand radially and thereby increase its axial dimension to enhance compression, and a pliable sealant covering said slits.